(12) United States Patent
Waldman et al.

(10) Patent No.: US 8,850,013 B2
(45) Date of Patent: Sep. 30, 2014

(54) SERVER LOAD BALANCING USING GEODATA

(76) Inventors: Jaron Waldman, Palo Alto, CA (US); Moran Ben-David, Mountain View, CA (US); John Alexander Leslie, San Francisco, CA (US)

( * ) Notice: Subject to any disclaimer, the term of this patent is extended or adjusted under 35 U.S.C. 154(b) by 286 days.

(21) Appl. No.: 12/777,067

(22) Filed: May 10, 2010

(65) Prior Publication Data
US 2011/0276692 A1    Nov. 10, 2011

(51) Int. Cl.
*G06F 15/173* (2006.01)
*G06F 9/50* (2006.01)

(52) U.S. Cl.
CPC .................................. *G06F 9/5083* (2013.01)
USPC ........... 709/226; 709/203; 709/234; 709/235; 370/229

(58) Field of Classification Search
CPC ... H04W 84/18; H04W 84/045; H04W 12/04; H04L 63/0428; H04L 67/18
USPC .................................. 709/226, 203, 234, 235
See application file for complete search history.

(56) References Cited

U.S. PATENT DOCUMENTS

| | | |
|---|---|---|
| 7,177,933 B2 | 2/2007 | Foth |
| 2005/0198250 A1 | 9/2005 | Wang |
| 2006/0123225 A1* | 6/2006 | Sharma et al. ................ 713/153 |
| 2006/0195687 A1* | 8/2006 | Klein et al. ................... 713/150 |
| 2007/0287473 A1* | 12/2007 | Dupray ...................... 455/456.1 |
| 2010/0182145 A1* | 7/2010 | Ungari ..................... 340/539.13 |

FOREIGN PATENT DOCUMENTS

EP    1 566 949 A1    8/2005

OTHER PUBLICATIONS

Y. G. Leclerc, M. Reddy, L. Iverson and M. Eriksen, "The GeoWeb—A New Paradigm for Finding Data on the Web," In Proceedings of the International Cartographic Conference (ICC2001), Beijing, Aug. 6-10, 2001 (Available online at http://cartography.tuwien.ac.at/ica/documents/ICC_proceedings/ICC2001/icc2001/file/f15008.doc, last visited May 6, 2010).

* cited by examiner

*Primary Examiner* — Phuoc Nguyen
*Assistant Examiner* — Clarence John
(74) *Attorney, Agent, or Firm* — Womble Carlyle Sandridge & Rice, LLP

(57) ABSTRACT

The present technology relates to serving geodata based on location of a requesting device. More specifically, the technology efficiently services requests for geodata, e.g., map data, by directing requests to a server that stores a shard of an entire database of geodata. A request for geodata includes an unencrypted header having a location of a device making the request for geodata. The present technology relates the location to a shard storing data relevant to the location.

20 Claims, 6 Drawing Sheets

SERVER LOAD BALANCING USING GEODATA

FIELD

The following relates to server load balancing and in particular server load balancing using geographical location by distributing data based on geographical location.

BACKGROUND

The amount of data that describes map objects continues to expand. As any user of electronic mapping formats realizes, new features are routinely being added. Today electronic maps include a great deal of information about objects described by vector data. As many commercial electronic mapping implementations move from simpler raster-based map representations to object vector data, each object seemingly can be represented in a variety of views including illustrated views, satellite views, terrain views, street-level views, etc. Additionally, maps today include information about the specific object beyond its location including, where appropriate, contact information, traffic information, etc.

Such an increase in the volume of data describing map objects, i.e., map data, presents challenges in searching and serving map data to a high volume of users. Typically, the map data needs to be loaded into random access memory (RAM) and searched within RAM to provide reasonable response times. However, RAM is limited and it can be expensive, and accordingly, it is not practical to store all map data describing all map objects in the world on a single machine's RAM. Map data needs to be distributed across multiple machines RAM, but in such a way that all of the data required to service a request for map data is located on the same machine, at least for the majority of requests.

SUMMARY

The present technology presents a more efficient method and system for servicing requests for geodata, e.g., map data. Geodata, being any data associated with a geographic coordinate such as map data representing the world, or representing objects collectively making up the world, can be divided among a plurality of servers based on geographical divisions in a process known as sharding. Sharding divides a collection of data into multiple segments called shards. Thus, each division of the world is a shard of geodata which includes data describing that segment of the world, data describing objects collectively making up that segment of the world, and/or data associated with a coordinate falling within that segment of the world.

The shards of geodata can be distributed among a plurality of servers. Accordingly, each server is only responsible for a limited portion of the entire data set, which enables faster retrieval of geodata. Additionally, the same shard of data can be stored on more than one server so that multiple servers can share the load of serving many requests. This is especially useful in systems serving a high volume of requests.

A user can make a request for geodata using a computing device. The computing device can send an electronic communication that includes a clear header having a rounded-off location coordinate(s) and a message that is encrypted. The communication is sent to a content switch, which performs the function of determining which server or servers from among the plurality of servers stores the shard of geodata that is relevant to the request for data. The content switch can efficiently make this determination by referencing the unencrypted rounded-off location coordinate(s) in the header of the communication. Additionally, if more than one server can service the request, the content switch performs a load-balancing function by determining which server is likely to most efficiently service the request. Thus, the content switch determines a server to service the request and passes the request for data to that server for servicing.

Accordingly, the present technology provides a more efficient system and method of servicing a high volume of requests for data, and is especially efficient at handling a large volume of requests for data selected from large data sets. In some embodiments, the datasets include geographic relationships, such as present in known mapping datasets.

DESCRIPTION

The technology described herein relates to server load-balancing by distributing data describing geo objects across a plurality of servers and directing requests for data to one of the plurality of servers based on the geographic location of the user.

Geodata describing objects which collectively make up the world, a continent, a country, a state, or a region, etc., or objects associated with a geographic location can be sharded, i.e., the geodata database can be partitioned across multiple servers into a collection of shards, with each shard containing data describing a limited portion of the whole. While the geodata can be divided in many different ways, in the present technology, the geodata can be divided based in geographic regions. Accordingly, all data describing a geo object within a region will be stored on the shard associated with that region. For example, if a shard contains all data describing all points on earth between longitude −70° and −80°, data describing New York, N.Y., USA and Lima, Peru would be found in this shard along with data describing other Eastern North American cities and Western South American cities. In this way, geodata representing the entire world can be divided onto different servers based on geographic location.

Some shards will receive more traffic, i.e., more requests for data to be served. For example, a shard having data describing longitude between −70° and −80° will receive much more traffic than a shard having data describing between longitude −45° and −15° (the Atlantic Ocean, Greenland, portions of Brazil) because longitude between −70° and −80° is more densely populated.

To accommodate a greater volume of traffic in some shards than others, shards can also be redundantly stored on multiple servers. In such instances, one server can comfortably handle the amount of data, but the volume of traffic that the server would have to handle would unacceptably reduce the performance of the server. To solve this problem, a shard can be redundantly stored on several different servers.

Since the geodata is distributed among a plurality of servers, the system utilizes a content switch to route requests for data. The content switch utilizes logic to determine the location from which the request was issued or, the location to which the request pertains and identifies shards that can service the request. The content switch can further include load-balancing logic to distribute requests among a plurality of servers, each having the same data, to improve the performance of the servers by distributing the load across the plurality of servers.

Using the above-described technology, requests for geodata can be served efficiently to a high volume of users.

Figure 1:
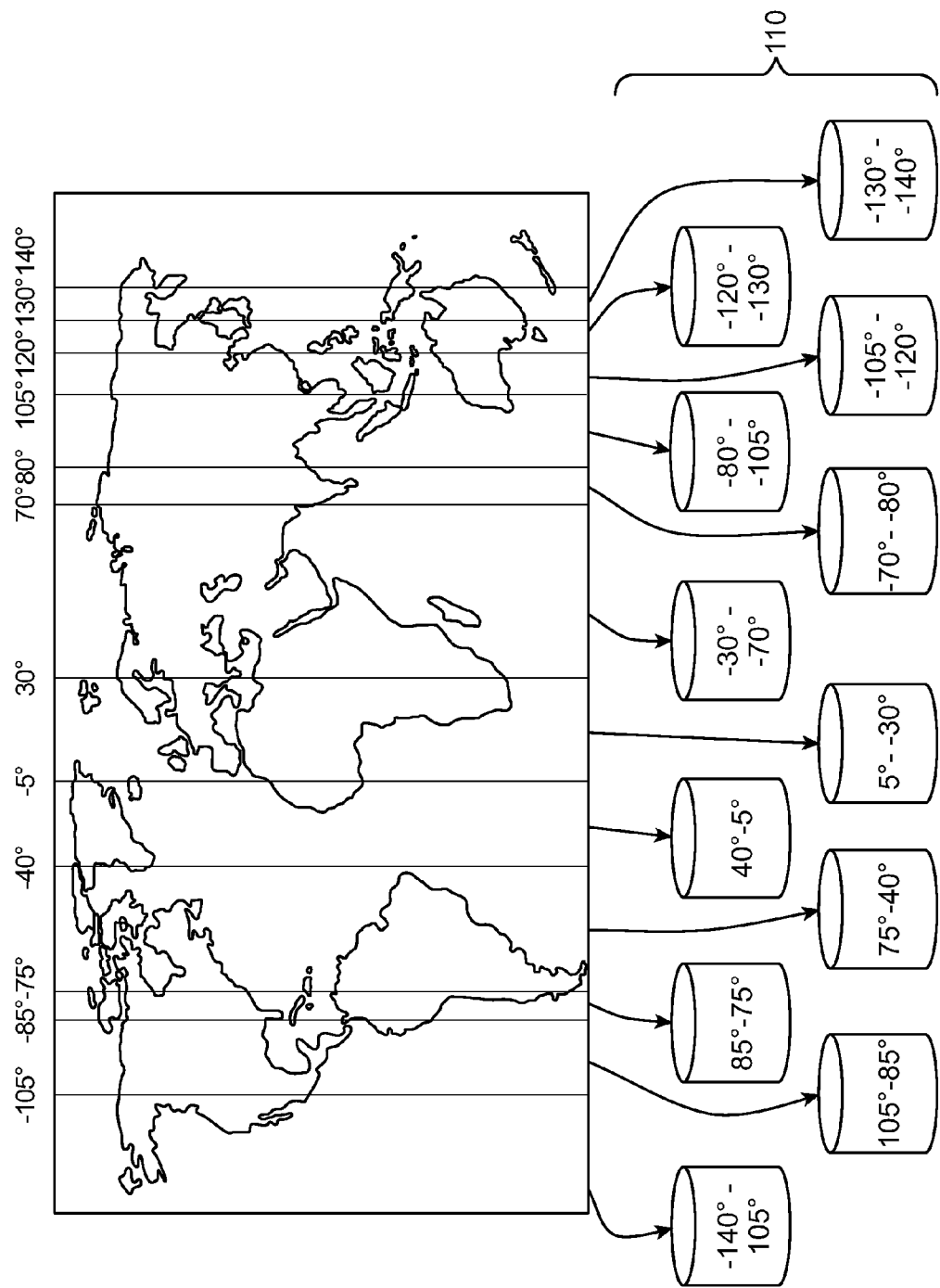
FIG. 1 illustrates a collection of geodata representing the world divided into shards.

FIG. 1 illustrates shards of geodata. A geo of the world is illustrated which represents a collection of geodata. As addressed above, the entire collection of geodata representing the world is too voluminous to store on one server and maintain acceptable performance when servicing a high volume of requests for data. Accordingly, the data describing map object making up the world can be divided among a collection of servers 110.

As illustrated in FIG. 1, the geodata is divided according to longitudinal ranges and a given range is stored on each server. However, the world's population is not divided evenly with respect to degrees of longitude. Therefore, the geodata is divided according to volume of geodata in a given region. For example, a large portion of the Pacific Ocean (140°--105°, i.e., an expanse of 120 degrees of longitude) is stored on one server ( ), while a region containing New York City along with the eastern United States and western South America covers an expanse of only 10° of longitude but also consumes a single server. The region including the Pacific Ocean does not contain many geo objects and therefore, even though the region is very large, the data describing the region is small. In contrast, the region including the Eastern United States and Western South America includes a large number of geo objects due to many densely populated cities and suburban areas, and therefore, even though the area is relatively small, the geodata describing it can be voluminous.

The shards of geodata should be small enough that a server can maintain the entire shard of data in RAM for fast access and quick searching. However, the shards of geodata should include enough data to allow the server storing the shard to service a full query. For example, if a user in Manhattan, a borough of New York City, performs a search, the shard should include data about Brooklyn (another borough of New York City) because a user could easily cross the Brooklyn Bridge from Manhattan into Brooklyn. In fact, data about objects in Brooklyn could be the most relevant depending on the request. Accordingly, a shard must be small enough for fast access and quick searching, but it also should be complete or robust enough to service a full request.

Figure 2:
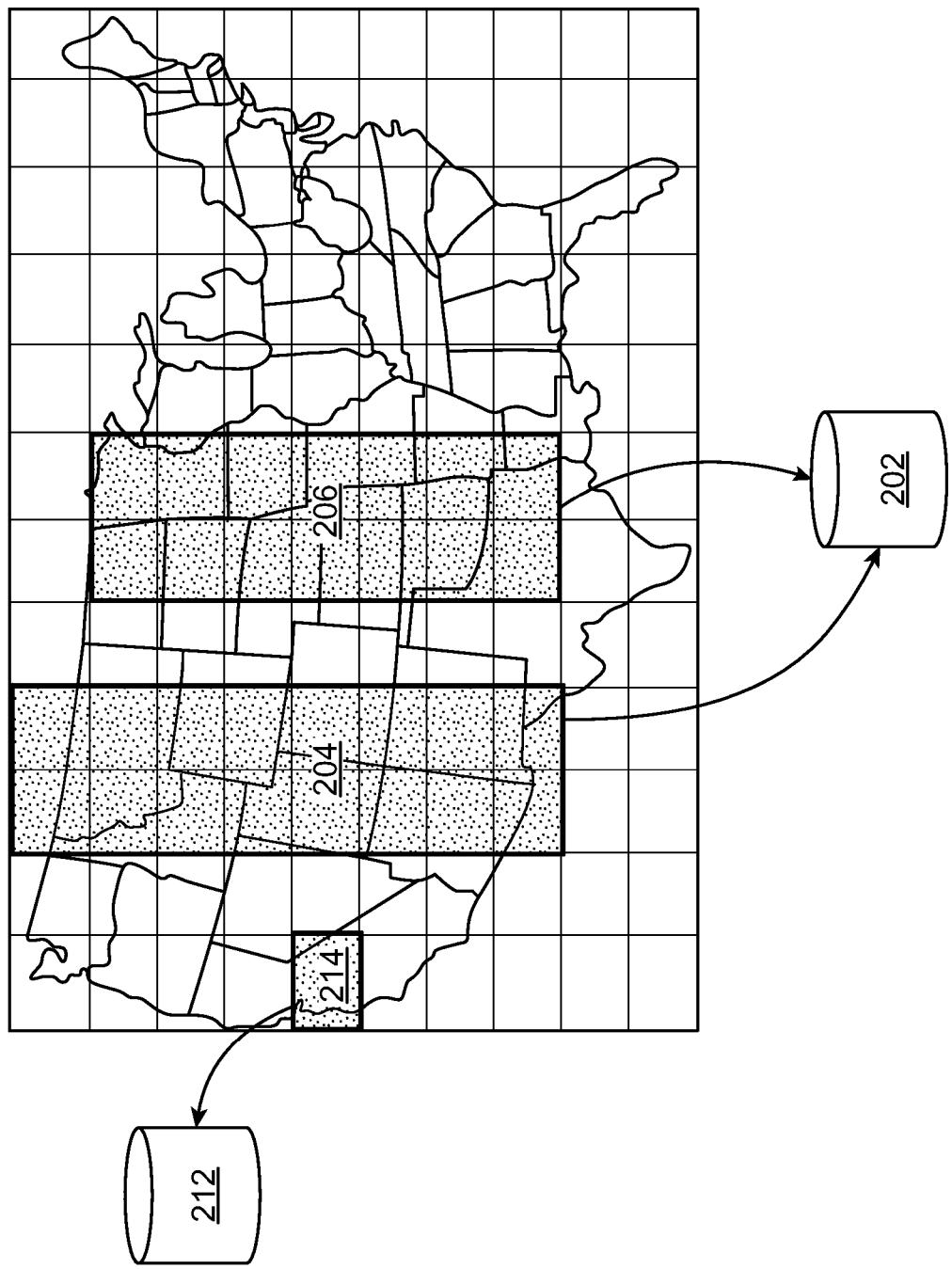
FIG. 2 illustrates a collection of geodata representing the United States divided into shards.

FIG. 2 illustrates another example of shards. While FIG. 2 only illustrates a geodata of the United States, it should be appreciated that this method is also applicable to any geodata. The geo in FIG. 2 is shown divided into a grid of latitude and longitude. Each rectangle in the grid can represent a single cell of data. In this method, each cell is the same, or roughly the same geographic size; and accordingly, some cells will contain less data than others.

To accommodate the fact that some cells will contain less data than others, cells can be combined into shards made up of a plurality of cells. In such embodiments, a cell can be considered a basic unit of a shard, which can be combined into larger groups of data. FIG. 2 illustrates that a single cell overlapping several Northern California cities (San Jose, San Francisco, Sacramento) contains enough data that the cell itself can be its own shard. Accordingly, shard 214 is shown being stored on a server disk 212. In contrast, the gray cells overlapping Idaho, Montana, Wyoming, Western Colorado, New Mexico, Utah, and parts of Arizona illustrate a shard 204 made up of several cells. Shard 204 is stored on server disk 202.

Likewise, the gray cells overlapping North and South Dakota, Minnesota, Nebraska, Iowa, Kansas, Missouri, Oklahoma, Arkansas and Northern Texas are combined to make up shard 206. Shard 206 is also stored on server disk 202, which illustrates that multiple shards can be stored on the same server disk. However, the collective shards on the same server should not get so large that their size will adversely affect the performance of the server because that would defeat the purpose of dividing the geodata into shards.

Just as cells can be combined into shards and multiple shards can be stored on the same server, if a shard gets too large, it can be subdivided into multiple sub-shards. Cells can also be divided into multiple sub-cells if they get too large. In some embodiments, a cell has a maximum size, for example two gigabytes. If the cell exceeds this size, it can be split into two or more cells. As can be appreciated, this ability to split and combine cells and shards allows the system to be scalable and to accommodate new geodata. For example, shard 214 could be subdivided if the geographic area it represents becomes so dense with geodata that the shard exceeds a defined upper limit on its size.

Figure 3:
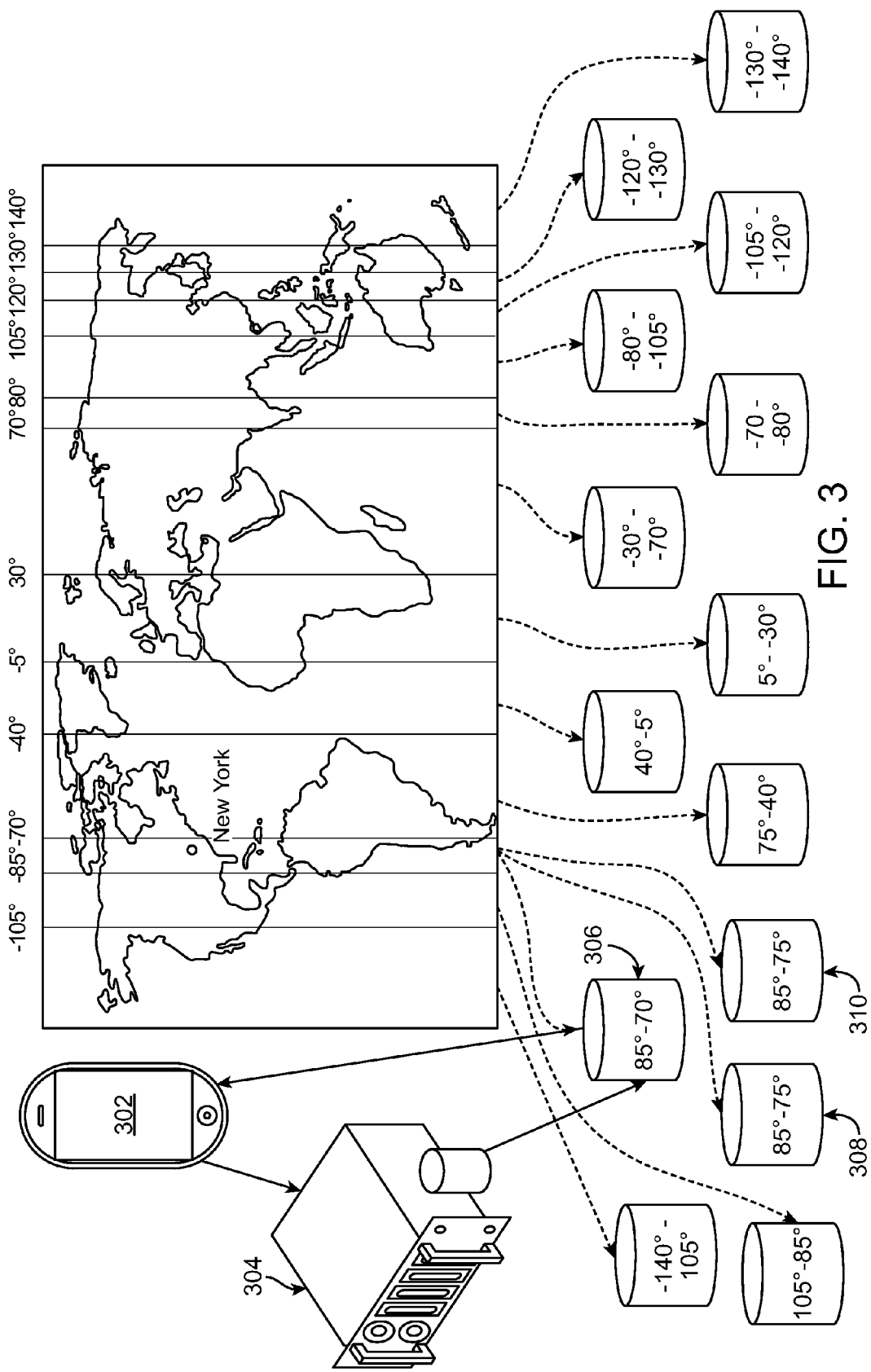
FIG. 3 is a schematic illustration of an exemplary system embodiment.

FIG. 3 illustrates a system embodiment comprising a computing device 302, a content switch 304, and server disks 306, 308 and 310. Each server disk is preferably associated with a separate server. The computing device 302 can be any computing device that is capable of communication with remote servers, such as a desktop computer, laptop, portable GPS device, personal digital assistant, etc. As illustrated, the computing device 302 is a handheld computing device such as a smart phone. A user using the computing device 302 can operate a mapping application which requests geodata from the server. The request is initially directed to a content switch 304 that determines which server from among the collection of servers 310 stores the data needed to service the request. The content switch 304 communicates with a selected server 306, which services the request.

In addition to the routing function of the content switch 304, wherein the content switch determines which server stores the appropriate shard of data, the content switch 304 also performs a load-balancing function. Server disks 306, 308, and 310 each store the same shard of geodata. Mirroring the data on several different servers provides multiple advantages. Namely, the redundancy increases the reliability of the system because if one server goes offline, the other servers can remain in service. Additionally, it allows multiple servers to split the load to more efficiently service requests. As illustrated in FIG. 3, servers 306, 308, and 310 all store data describing the Eastern United States and Western South America. Both regions include multiple large cities and accordingly, many users, which correlate to many requests for data. The burden of receiving many requests on one server might hinder performance, but if additional servers split the requests, satisfactory performance can be maintained.

Figure 4:
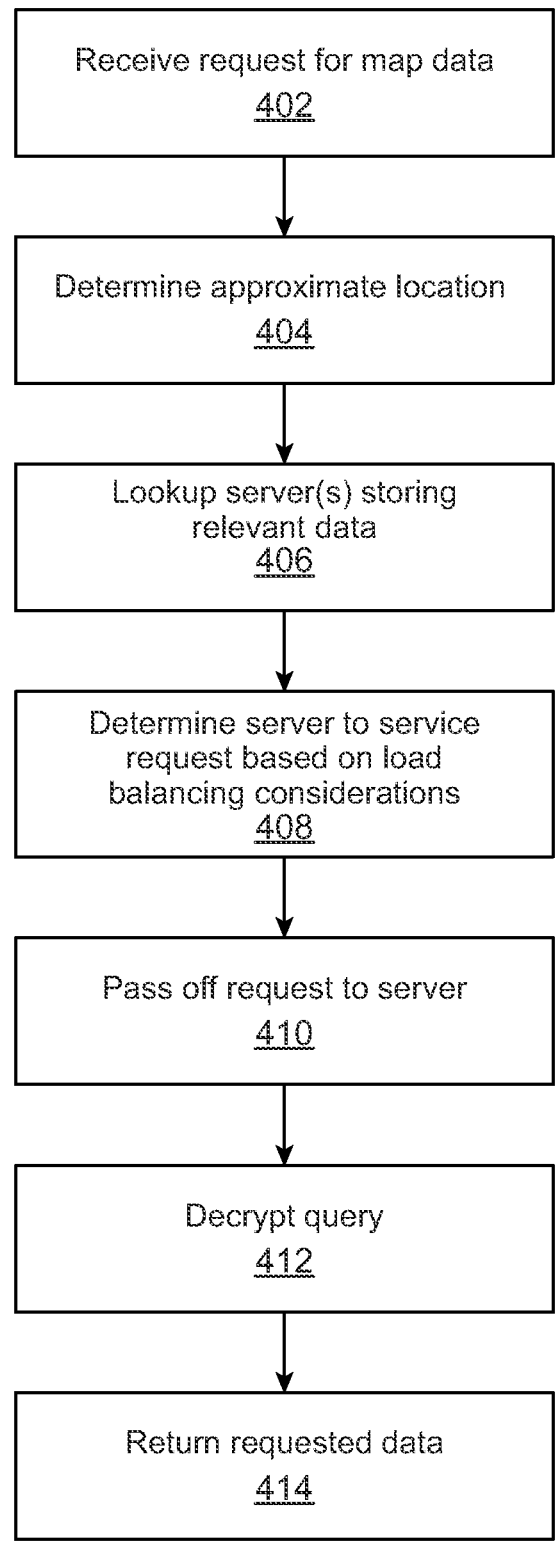
FIG. 4 is a flowchart illustrating a method of receiving a request and determining a server to service the request.

FIG. 4 illustrates a method embodiment for receiving and servicing a request for geodata using a system such as that illustrated in FIG. 3. A request for geodata can be received from a computing device (402) at a content switch. The content switch determines the server(s) that store(s) the relevant information to service the request by determining the approximate geographic coordinates of the computing device sending the request for geodata (404).

Figure 5:
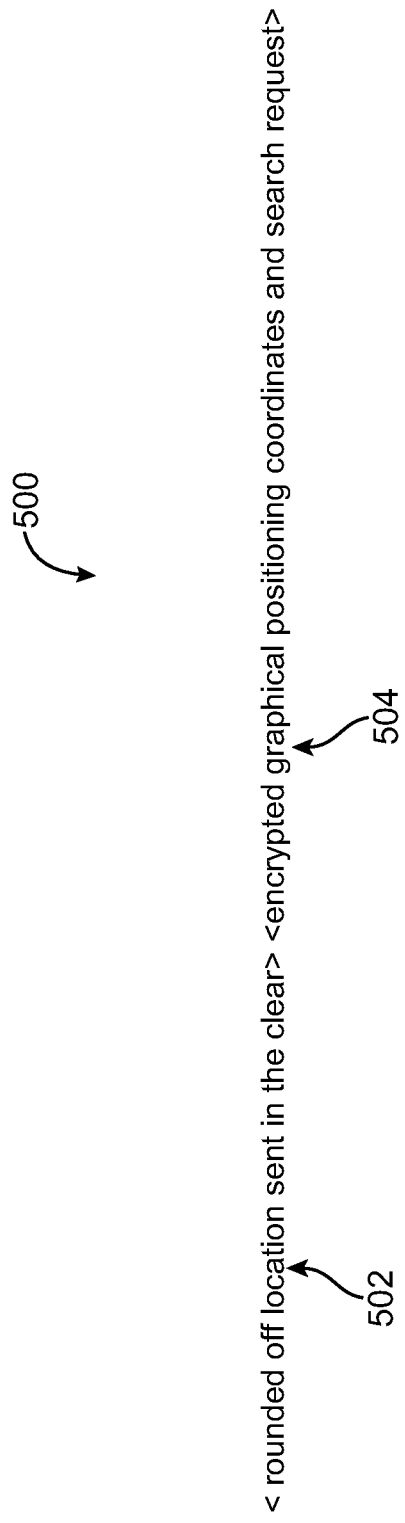
FIG. 5 illustrates an exemplary format for a request for data.

The content switch determines the approximate geographic coordinates of the computing device sending the request by examining data in the request. An exemplary request format 500 is illustrated in FIG. 5. The request includes a header portion 502, which includes an approximate location coordinate(s). The header is not encrypted, so the content switch does not need to use additional resources to decrypt the request and therefore, the content switch can more efficiently route the request. The message portion 504 of the request can include detailed global positioning system coordinates and information specifying the search parameters. The message portion 504 can be encrypted since the information in the message especially the location information can be considered sensitive data.

The header portion 502 can contain a longitudinal value and optionally, a latitudinal value that represents an approximate location of the requesting device. For example, the device can round its global positioning coordinates to the nearest degree or nearest tenth, or hundredth of a degree, etc. The approximation should be sufficient to identify a shard but general enough so that the information in the header cannot be used to identify the actual location of the user.

From the header portion of the request, the content switch can read the approximate location of the requesting device (404) and look up the server(s) storing the data needed to service the request (406). As described with respect to FIG. 3, one or more servers can each store the same shard of data. If more than one server can service the request because each server stores the same shard of data, the content switch determines which server should service the request (408). The content switch can make this determination using load-balancing considerations including measured response times in servicing other recent requests, volume of requests handled by each server, etc.

Upon determining the best server to handle the request, the content switch passes off the computing device to the selected server (410). The server can then decrypt the message body (412) to determine the query and return a response to the computing device (414). Accordingly, the present technology provides for more efficient servicing of requests for geodata.

Thus far, the disclosed technology has been described with respect to a computing device requesting geodata for an area proximate to the present location of the computing device. While this is the most common search, and therefore it can be more efficient to assume that a request for geodata pertains to an area proximate to the requesting computing device, in some embodiments the system can accommodate searches for data in other regions, i.e., searches for geodata that is stored within a shard that is different from the shard having data describing the region that the computing device is presently in. In such embodiments, the computing device can determine that the user is requesting data from a remote region and ascertain which approximate geographic location the request pertains to and include these coordinates in the header of the request, which can be processed just as described with respect to FIG. 4.

Figure 6:
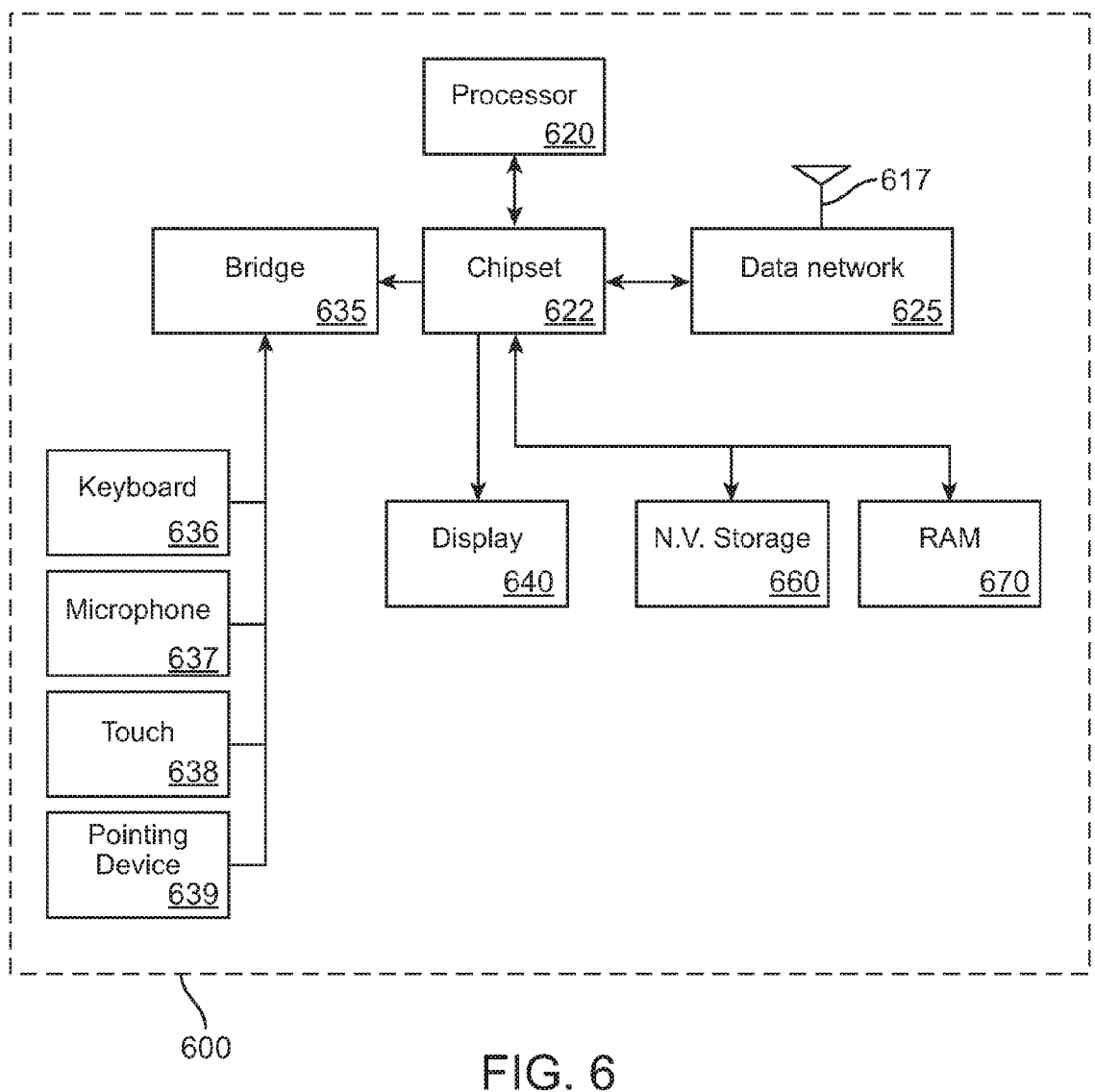
FIG. 6 is a schematic illustration of an exemplary system embodiment.

FIG. 6 illustrates a computer system 600 used in executing the described method. Computer system 600 is an example of computer hardware, software, and firmware that can be used to implement disclosures above. For example, computer system 600 can implement disclosures related to the computing device, content switch, or servers described herein. System 600 includes a processor 620, representative of any number of physically and/or logically distinct resources capable of executing software, firmware, and hardware configured to perform identified computations. Processor 620 communicates with a chipset 622 that can control input to and output from processor 620. In this example, chipset 622 outputs information to display 640 and can read and write information to non-volatile storage 660, which can include magnetic media and solid-state media, for example. Chipset 622 also can read data from and write data to RAM 670. A bridge 635 for interfacing with a variety of user interface components can be provided for interfacing with chipset 622. Such user interface components can include a keyboard 636, a microphone 637, touch detection and processing circuitry 638, a pointing device, such as a mouse 639, and so on. In general, inputs to system 600 can come from any of a variety of sources, machine-generated and/or human-generated.

Chipset 622 also can interface with one or more data network interfaces 625 that can have different physical interfaces 617. Such data network interfaces can include interfaces for wired and wireless local area networks, for broadband wireless networks, as well as personal area networks. Some applications of the methods for collecting data in the location-popularity index and ranking and returning location search results disclosed herein can include receiving data over physical interface 617 or be generated by the machine itself by processor 620 analyzing data stored in memory 660 or 670. Further, the machine can receive inputs from a user via devices 636, 637, 638, 639 and execute appropriate functions by interpreting these inputs using processor 620.

Methods according to the above-described examples can be implemented using computer-executable instructions that are stored or otherwise available from computer-readable media. Such instructions comprise, for example, instructions and data which cause or otherwise configure a general purpose computer, special purpose computer, or special-purpose processing device to perform a certain function or group of functions. Portions of computer resources used can be accessible over a network. The computer executable instructions may be, for example, binaries, intermediate-format instructions such as assembly language, firmware, or source code. Examples of computer-readable media that may be used to store instructions, information used, and/or information created during methods according to described examples include non-transitory computer readable media such as magnetic or optical disks, flash memory, USB devices provided with non-volatile memory, networked storage devices, random access memory, volatile memories and so on. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Devices implementing methods according to these disclosures can comprise hardware, firmware, and/or software, and can take any of a variety of form factors. Typical examples of such form factors include laptops, smart phones, small form factor personal computers, personal digital assistants, servers and so on. Functionality described herein also can be embodied in peripherals or add-in cards. Such functionality also can be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further, and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method for storing and manipulating map data describing map objects, the method comprising:
   receiving, from a mobile computing device, a request for map data describing one or more map objects located in a first geographic region, wherein the request includes an unencrypted header portion and an encrypted message portion, and the unencrypted header portion stores approximate location coordinates of the mobile computing device identifying an approximate location of the mobile computing device within the first geographic region;
   identifying one or more servers storing the one or more map objects for the first geographic region based on the approximate location coordinates in the unencrypted header portion; and
   routing the request to at least one of the identified one or more servers, wherein the request is serviced based on the encrypted message portion and the encrypted message portion stores detailed location coordinates of the mobile computing device identifying an actual location of the mobile computing device within the first geographic region, and the actual location of the mobile computing device is not identified via the unencrypted header portion.

2. The method of claim 1, wherein the encrypted message portion comprises the detailed location coordinates of the mobile computing device and one or more search parameters.

3. The method of claim 2, wherein the encrypted message portion is configured to be decrypted and processed by the at least one of the identified one or more servers to service the request for map data.

4. The method of claim 2, wherein the at least one of the identified one or more servers is configured to decrypt the encrypted message portion and service the request for map data by returning a map object located in the first geographic region.

5. The method of claim 1, wherein the map data describing the one or more map objects is redundantly stored on a plurality of servers.

6. The method of claim 5, wherein the request is routed based on one or more factors, and at least one of the factors comprises a response time of each server of the plurality of servers redundantly storing the one or more map objects and one or more associated attributes for the first geographic region, thereby balancing a load on each server of the plurality of servers.

7. The method of claim 1, wherein the approximate location coordinates comprise an approximate longitude of the mobile computing device.

8. The method of claim 1, wherein the approximate location coordinates further comprise an approximate latitude of the mobile computing device.

9. The method of claim 1, further comprising:
   receiving a second request for map data describing one or more map objects located in a second geographic region different from the first geographic region, the second request comprising a second unencrypted header portion and a second encrypted message portion;
   determining an approximate location associated with the second geographic region; and
   including the approximate location in the second unencrypted header portion.

10. A system for storing and manipulating map data describing map objects, the system comprising:
    a plurality of servers collectively storing map data in random access memory (RAM),
    wherein the map data is divided into a plurality of shards and each server has one or more shards of the plurality of shards of map data stored thereon; and
    a content switch configured to:
      receive, from a mobile computing device, a request for at least a portion of the map data describing one or more map objects located in a first geographic region, wherein the request includes an unencrypted header portion and an encrypted message portion, and the unencrypted header portion stores approximate location coordinates of the mobile computing device identifying an approximate location of the mobile computing device within the first geographic region,
      identify at least one server from among the plurality of servers that stores the one or more map objects for the first geographic region based on the approximate location coordinates in the unencrypted header portion, and
      route the request for at least a portion of the map data to the identified at least one server, wherein the request is serviced based on the encrypted message portion and the encrypted message portion stores detailed location coordinates of the mobile computing device identifying an actual location of the mobile computing device within the first geographic region, and the actual location of the mobile computing device is not identified via the unencrypted header portion.

11. The system of claim 10, wherein the encrypted message portion comprises the detailed location coordinates of the mobile computing device and one or more search parameters.

12. The system of claim 10, wherein each shard of the plurality of shards includes map data for a defined geographic area.

13. The system of claim 10, wherein one or more shards of the plurality of shards are redundantly stored on two or more servers of the plurality of servers.

14. The system of claim 10, wherein more than one shard of the plurality of shards is stored on a same server.

15. A product for storing and manipulating map data describing map objects, the product comprising:
    a non-transitory machine-readable storage medium configured to store instructions that, when executed by a processor included in a computing device, cause the computing device to carry out steps that include:
      receiving a request for the map data describing one or more map objects from a mobile computing device, the one or more map objects located in a first geographic region;
      including, in the request, an unencrypted header portion and an encrypted message portion, wherein the unencrypted header portion stores approximate location coordinates of the mobile computing device identifying an approximate location of the mobile computing device within the first geographic region;

extracting the approximate location coordinates from the unencrypted header portion;

identifying one or more servers storing the one or more map objects for the first geographic region based on the approximate location coordinates extracted from the unencrypted header portion;

selecting one of the identified one or more servers based on one or more load balancing considerations; and routing the request to the selected server, wherein the request is serviced based on the encrypted message portion and the encrypted message portion stores detailed location coordinates of the mobile computing device identifying an actual location of the mobile computing device within the first geographic region, and the actual location of the mobile computing device is not identified via the unencrypted header portion.

16. The product of claim 15, wherein the map data is redundantly stored on a plurality of servers.

17. The product of claim 16, wherein one of the load balancing considerations includes a response time of each server of the plurality of servers.

18. The product of claim 15, wherein the approximate location coordinates comprise an approximate longitude of the mobile computing device making the request for map data.

19. The product of claim 15, wherein the approximate location coordinates comprise an approximate latitude of the mobile computing device.

20. The product of claim 15, wherein the selected server is configured to decrypt the encrypted message portion and service the request for the map data.

* * * * *